United States Patent
Linz et al.

(10) Patent No.: US 11,287,028 B2
(45) Date of Patent: Mar. 29, 2022

(54) ASSEMBLY FOR SECURING THE AXIAL POSITION OF A SUN GEAR OF A PLANETARY GEARING STAGE ON A ROTOR SHAFT OF AN ELECTRICAL MACHINE, AND USE OF SUCH AN ASSEMBLY

(71) Applicant: Schaeffler Technologies AG & Co. KG, Herzogenaurach (DE)

(72) Inventors: Bernhard Linz, Wilhelmsdorf (DE); Marcel Laake, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/050,005

(22) PCT Filed: Feb. 19, 2019

(86) PCT No.: PCT/DE2019/100152
§ 371 (c)(1),
(2) Date: Oct. 23, 2020

(87) PCT Pub. No.: WO2019/214762
PCT Pub. Date: Nov. 14, 2019

(65) Prior Publication Data
US 2021/0231212 A1    Jul. 29, 2021

(30) Foreign Application Priority Data
May 7, 2018  (DE) ............ 10 2018 110 879.6

(51) Int. Cl.
*F16H 57/08*    (2006.01)
*H02K 7/116*    (2006.01)
(Continued)

(52) U.S. Cl.
CPC .......... *F16H 57/082* (2013.01); *H02K 7/116* (2013.01); *F16H 57/023* (2013.01); *F16H 2057/085* (2013.01); *H02K 7/003* (2013.01)

(58) Field of Classification Search
None
See application file for complete search history.

(56) References Cited

U.S. PATENT DOCUMENTS 4,277,199 A    7/1981  Livesay
5,127,764 A *  7/1992  Baer ............... F16B 21/186
                                              403/316

(Continued)

FOREIGN PATENT DOCUMENTS

DE    102007023125 A1    11/2008
DE    102011082017 A1     3/2013
JP       2016125503 A     7/2016

OTHER PUBLICATIONS

Database WPI, Week 281649, Thomson Scientific, London, GB; AN 2016-416953, XP882791241.

*Primary Examiner* — Dirk Wright

(57) ABSTRACT

An assembly secures the axial position of a sun gear of a planetary gearing stage on a rotor shaft of an electrical machine. The sun gear has an end section that is stepped radially outward on the inner diameter and is axially secured on the rotor shaft by means of at least one securing ring. At least one securing element is provided to secure against the centrifugal forces acting on the securing ring during rotation of the rotor shaft. The securing element is inserted into the end section on the sun gear and is at least partially pushed over the securing ring and radially secures the same.

20 Claims, 1 Drawing Sheet

(51) Int. Cl.
*F16H 57/023* (2012.01)
*H02K 7/00* (2006.01)

(56) References Cited

U.S. PATENT DOCUMENTS

| | | | | |
|---|---|---|---|---|
| 5,620,388 | A * | 4/1997 | Schlegelmann | F16H 48/08 403/315 |
| 6,014,916 | A * | 1/2000 | Tyson | F16H 48/142 475/230 |
| 6,557,947 | B1 * | 5/2003 | Hunt | B60B 27/001 188/17 |
| 6,792,823 | B2 * | 9/2004 | Takahashi | B41J 3/4075 403/316 |
| 7,104,912 | B2 * | 9/2006 | Morgensai | F16D 3/06 475/231 |
| 9,506,497 | B2 * | 11/2016 | Khanfar | F16C 3/02 |
| 9,933,005 | B2 * | 4/2018 | Kahl | B23P 19/084 |
| 10,781,866 | B2 * | 9/2020 | Avdusinovic | F16B 21/186 |
| 2004/0168878 | A1 | 9/2004 | Yabe et al. | |
| 2015/0308488 | A1 | 10/2015 | Kahl | |

* cited by examiner

ASSEMBLY FOR SECURING THE AXIAL POSITION OF A SUN GEAR OF A PLANETARY GEARING STAGE ON A ROTOR SHAFT OF AN ELECTRICAL MACHINE, AND USE OF SUCH AN ASSEMBLY

CROSS-REFERENCE TO RELATED APPLICATIONS

This application is the U.S. National Phase of PCT Appln. No. PCT/DE2019/100152 filed Feb. 19, 2019, which claims priority to DE 10 2018 110 879.6 filed May 7, 2018, the entire disclosures of which are incorporated by reference herein.

TECHNICAL FIELD

The disclosure relates to an assembly for securing the axial position of a sun gear of a planetary gearing stage on a rotor shaft of an electrical machine and to the use of such an assembly.

BACKGROUND

From DE 10 2011 082 017 A1 a bearing assembly for a drive device with at least one electrical machine is known. A first and a second roller bearing are provided there for mounting a rotor shaft of an electrical machine. The roller bearings are each fixed on the rotor shaft by a securing ring embedded in a shaft groove. A disadvantage of this embodiment is the fact that with simple standard securing rings, the centrifugal forces acting during operation can lead to an expansion and loosening of the respective securing ring on rotor shafts in electrical machines from a speed of approx. 6000 rpm and higher, whereby the axial securing on the rotor shaft is no longer guaranteed. Therefore, in such cases, the use of special securing rings, in particular with what is termed a self-locking function, is necessary. These are self-contained and therefore cannot open under centrifugal force. The use of special securing rings is expensive and can only be implemented in series installation with great effort or only by hand. In addition, uninstallation is usually only possible by destroying the securing ring.

SUMMARY

It is desirable to simplify an assembly of the aforementioned type with regard to the structure and installation thereof and of making it operationally reliable.

An assembly is proposed for securing the axial position of a sun gear of a planetary gearing stage on a rotor shaft of an electrical machine. The sun gear has an end section that is stepped radially outward on the inner diameter and is axially secured on the rotor shaft with at least one securing ring. To secure against the centrifugal forces acting on the securing ring when the rotor shaft rotates, at least one securing element is provided which is inserted into the end section on the sun gear for attaching and at least partially pushed over the securing ring and radially securing same. In this way a centrifugal force securing ring that is of simple construction and that is easily installed is achieved, which is at least partially integrated into the sun gear in a space-saving manner. As a result, centrifugal force-related expansion and loosening of the securing ring during operation can be reliably avoided and the use of standard securing rings that are easy to manufacture and install on rotor shafts of electrical machines is possible regardless of the speed of the same. In return, it is possible to dispense with expensive special securing rings or other elaborately designed solutions that are difficult to manufacture and install.

It is advantageous if the securing element is inserted into the sun gear for attachment with a force fit. The assembly is particularly easy to install and uninstall without being destroyed. Other releasable form-fitting or form-fitting and force-fitting connections, in particular a snap connection, are also conceivable.

In a particularly preferred embodiment, the securing element is designed as a securing sleeve which is pressed axially into the radially outwardly stepped end section of the sun gear. In a particularly advantageous manner, the securing sleeve is completely integrated into the sun gear in a space-saving manner.

The securing sleeve can be angled radially inward with one end section such that it radially encompasses the securing ring at the outer diameter with the free end face of the end section. In this way a centrifugal force securing of the securing ring that can be easily adapted to the installation conditions is enabled. The securing element is also easy to manufacture as a so-called angle sleeve.

It is also advantageous if the securing sleeve with an end section angled radially inward at right angles rests so as to be axially planar on a radial annular shoulder formed on the inner diameter of the sun gear.

A particularly simple uninstallation is made possible if the securing element has several openings for a pulling tool to engage.

The securing element can be easily produced without cutting by reshaping, in particular from sheet metal or plastic.

In the assembly, it is possible in a particularly advantageous manner to use at least one standard securing ring, for example a Seeger type SW securing ring, to secure the sun gear axially on the rotor shaft regardless of speed. This can be mass-produced inexpensively and can simply be attached to the rotor shaft for installation and attached in a securing groove on the outer diameter of the rotor shaft. It can also be easily uninstalled without being destroyed.

The assembly enables the sun gear to be assembled in an end region of the rotor shaft and secured axially. It preferably protrudes axially with the radially stepped end section beyond the end of the rotor shaft. As a result, in addition to the securing element, a further component can be at least partially integrated into the stepped end section of the sun gear to save space. For example, a seal assembled to be coaxial to the securing sleeve can engage radially in the end section of the sun gear protruding beyond the end of the rotor shaft and be applied to the inner diameter of the same for sealing. In a particularly advantageous manner, the seal can be supported with the inner diameter on the outer diameter of a shaft passed coaxially through the rotor shaft, which is embodied as a hollow shaft, for sealing purposes.

The assembly may be utilized in an electric axle drive of a vehicle. The assembly with the sun gear and the rotor shaft with the electrical machine forms an electric drive as part of the axle drive of the vehicle. In this case, a shaft is preferably passed through the rotor shaft in a space-saving manner as the output shaft of the electric axle drive.

BRIEF DESCRIPTION OF THE DRAWINGS

Further features result from the following description and the figures, in which an exemplary embodiment is shown in a simple manner.

DETAILED DESCRIPTION

Figure 1:
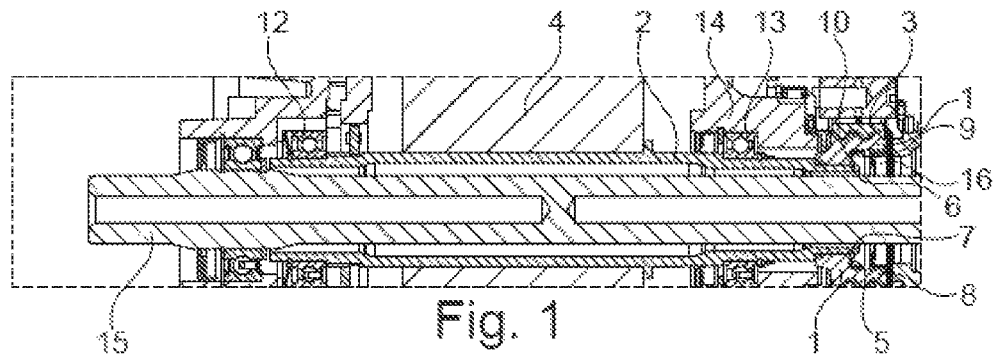
FIG. 1 shows a sectional view of an assembly for securing the axial position of a sun gear on a rotor shaft of an electrical machine.
Figure 2:
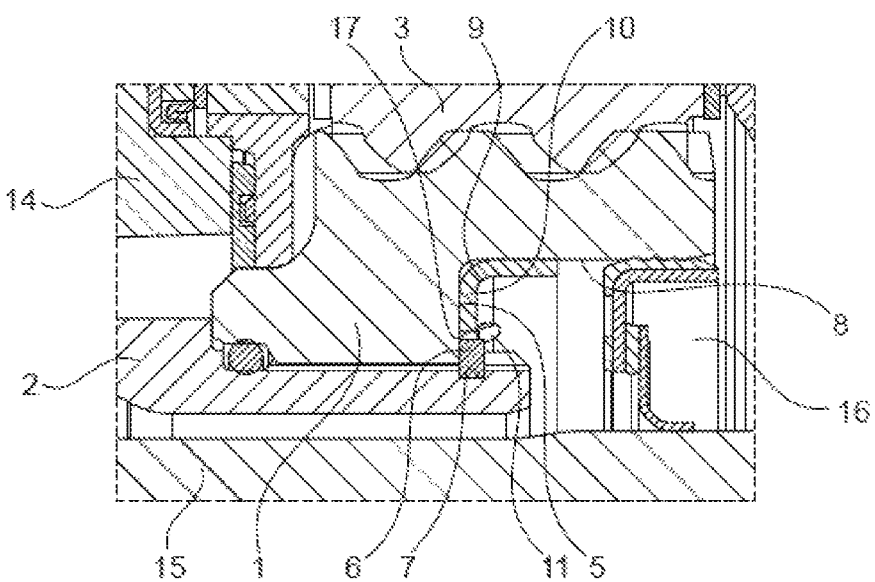
FIG. 2 shows an enlarged section from FIG. 1, FIGS. 3 and 4 show individual views of a securing element of the assembly.

FIGS. 1 and 2 show an example of an assembly for securing the axial position of a sun gear 1 of a planetary gearing stage on a rotor shaft 2 of an electrical machine. The sun gear 1 is non-rotatably assembled on the rotor shaft 2 and is in engagement with a set of planetary gears 3 of the planetary gearing stage, not shown, for driving purposes. The rotor shaft 2 carries a coaxially assembled rotor 4 of the electrical machine. On the axial side facing away from the rotor, the inner diameter of the sun gear 1 is stepped radially outward with a radial annular shoulder 5 and is axially secured thereon by a securing ring 6 assembled on the rotor shaft 2. The securing ring 6 secures the sun gear 1 to bear axially against the annular shoulder 5 of the same and is let into a securing groove 7 on the outer diameter of the rotor shaft 2 for attachment. The annular shoulder 5 delimits an end section 8 of the sun gear 1 that is stepped radially outward on the inner diameter and into which a securing element 9 is inserted coaxially at the end of the sun gear 1 facing away from the rotor. In this case, the securing element 9, bearing against the annular shoulder 5 as an installation stop, is pushed radially over the securing ring 6 bearing axially on the annular shoulder 5, as a result of which it is secured radially at the outer diameter thereof by the securing element 9.

Figure 3:
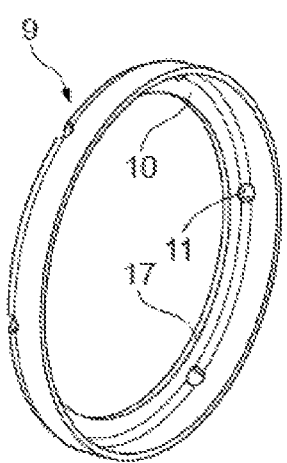
Figure 4:
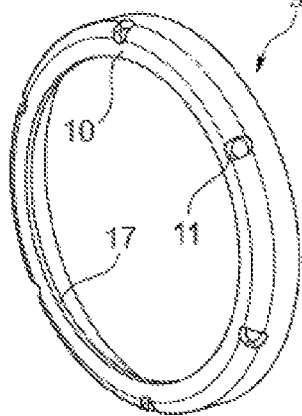
Figure 5:
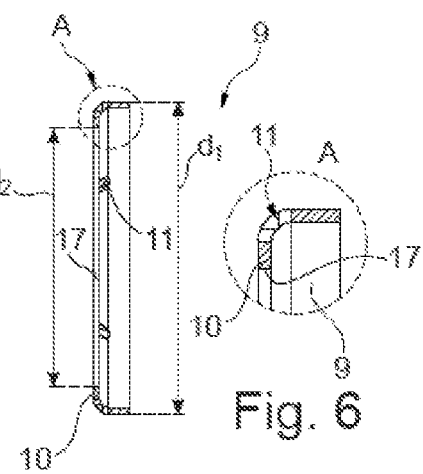
FIG. 5 shows a sectional view of a securing element from FIGS. 3 and 4.
Figure 6:
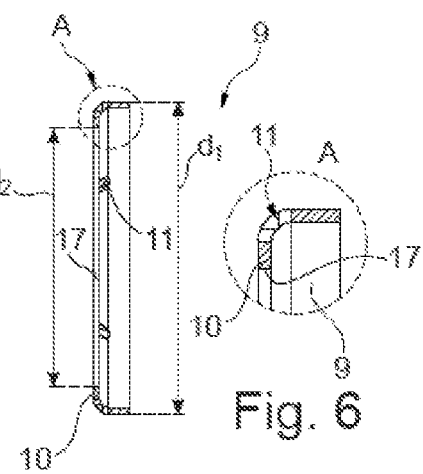
FIG. 6 shows an enlarged detail from FIG. 5.

The securing element 9 is designed as a securing sleeve which is fully axially pressed in with the outer diameter thereof on the inner diameter of the radially outwardly annularly stepped cylindrical end section 8 of the sun gear 1 (FIGS. 1 and 2). The securing sleeve 9 is angled radially inwards at right angles with an end section 10 and in this way forms what is termed an angled sleeve (FIGS. 3 to 5). With the angled end section 10, it bears axially against the annular shoulder 5 as an installation stop (FIG. 2). With the free end 17 of the end section 10, the securing sleeve 9 completely surrounds the outer diameter of the securing ring 6 in a radially annular manner. In this way it blocks the opening of the securing ring 6 under centrifugal force and the detachment of the same from the rotor shaft 2. This makes it possible to axially secure the sun gear 1 on the rotor shaft 2 in a particularly advantageous manner so that the securing ring 6 as a standard external securing ring, for example of the Seeger SW type, can be easily installed and uninstalled without being destroyed. The securing ring 6 is radially encompassed by the securing sleeve 9, which is completely integrated into the sun gear 1, for securing against the centrifugal forces.

With the radially angled end section 10, the securing sleeve 9 forms a right-angled L-shaped longitudinal profile as what is termed an angled sleeve or L-disk (FIGS. 3 to 6). The outer diameter $d_1$ of the securing sleeve 9 is selected so as to form a press fit with the inner diameter of the radially outwardly annularly stepped end section 8 of the sun gear 1, while the inner diameter $d_2$ of the securing sleeve 9 formed at the free end 17 of the angled end section 10 has a size that allows the securing sleeve 9 to be pushed with the free end 17 with a slight radial play over the outer diameter of the securing ring 6 during installation. In the area of the 90° curvature at the attachment of the angled end section 10 of the securing sleeve 9, several openings 11 are provided evenly distributed over the circumference (FIG. 6), which are designed as radial through bores into which a pulling tool can engage on the inner diameter of the securing sleeve 9 to pull the securing sleeve 9 out of the sun gear 1. In this way, it is possible to uninstall the securing sleeve 9 and the securing ring 6 without them being destroyed.

The sun gear 1 with the annular shoulder 5 and the securing ring 6 are assembled at one end region of the rotor shaft 2, the sun gear 1 with the end section 8 facing away from the rotor protruding beyond the end of the rotor shaft 2. As a result, a seal 16 assembled to be coaxial to the securing sleeve 9 can radially engage in the radially stepped end section 8 of the sun gear 1 and be integrated to bear against the inner diameter of the same (FIGS. 1 and 2). In this way, the securing sleeve 9 and the seal 16 can be assembled to be coaxial one behind the other in the stepped end section 8 of the sun gear 1, saving space.

The assembly can be used particularly advantageously in an electric axle drive of a vehicle (FIGS. 1 and 2). Here, the assembly with the sun gear 1 and the rotor shaft 2 of the electrical machine forms part of the axle drive. The bearings 12 form the rotor shaft bearings. The rotor shaft 2 is designed as a hollow shaft through which a shaft 15 is passed coaxially. This forms an output shaft of the electric axle drive, wherein the inner diameter of the seal 16 is supported on the outer diameter of the shaft 15 for sealing.

LIST OF REFERENCE SYMBOLS

1 Sun gear
2 Rotor shaft
3 Planetary gear
4 Rotor
5 Annular shoulder
6 Securing ring
7 Securing groove
8 End section
9 Securing element, securing sleeve
10 End section
11 Opening
12 Bearing
13 Bearing
14 Housing
15 Shaft
16 Seal
17 End
$d_1$ Outside diameter
$d_2$ Inside diameter

The invention claimed is:

1. An assembly for securing an axial position of a sun gear of a planetary gearing stage on a rotor shaft of an electrical machine, wherein the sun gear has an end section that is stepped radially outward on an inner diameter and is axially secured on the rotor shaft by a securing ring snapped onto the rotor shaft in a securing groove on an outer diameter of the rotor shaft, and a securing element is inserted into the end section of the sun gear and is at least partially pushed over the securing ring to radially secure the securing ring against centrifugal forces during rotation of the rotor shaft.

2. The assembly according to claim 1, wherein the securing element is inserted into the sun gear with a radial force fit.

3. The assembly according to claim 1, wherein the securing element is designed as a securing sleeve which is axially pressed into the radially stepped end section of the sun gear.

4. The assembly according to claim 3, wherein the securing sleeve is angled radially inward and the radially inward portion radially surrounds an outer diameter of the securing ring.

5. The assembly according to claim 4, wherein the radial inward portion of the securing sleeve rests against a radial annular shoulder formed on the inner diameter of the sun gear.

6. The assembly according to claim 1, wherein the securing element has a plurality of openings for engagement of a pulling tool for uninstallation.

7. The assembly according to claim 1, wherein the securing element is produced reshaping without producing shavings.

8. The assembly according to claim 1, wherein the sun gear is assembled in an end region of the rotor shaft and protrudes axially with the radially stepped end section beyond the end of the rotor shaft.

9. An electric axle drive comprising:
a first shaft;
a gear positioned on the first shaft and having an end section that is stepped radially outward on an inner diameter;
a securing ring axially securing the gear to the first shaft; and
a securing element inserted with a radial force fit into the end section of the gear radially over the securing ring to prevent release of the securing ring due to centrifugal forces during rotation of the first shaft.

10. The electric axle drive according to claim 9, wherein the securing element includes a planar inward portion resting against a radial annular shoulder formed on the inner diameter of the gear.

11. The electric axle drive according to claim 9, wherein the securing element defines a plurality of openings for engagement of a pulling tool for uninstallation.

12. The electric axle drive according to claim 9, wherein the securing ring is snapped onto the first shaft in a securing groove on an outer diameter of the first shaft.

13. The electric axle drive according to claim 9, wherein the first shaft is hollow and further comprising a second shaft radially inside the first shaft.

14. The electric axle drive according to claim 13 further comprising a seal press fit into the end section of the gear and sealingly contacting the second shaft.

15. An electric axle drive comprising:
a first shaft;
a gear positioned on the first shaft and having an end section that is stepped radially outward on an inner diameter;
a securing ring axially securing the gear to the first shaft; and
a securing element inserted into the end section of the gear radially over the securing ring to prevent release of the securing ring due to centrifugal forces during rotation of the first shaft, wherein the securing element defines a plurality of openings for engagement of a pulling tool for uninstallation.

16. The electric axle drive according to claim 15, wherein the securing element is inserted into the gear with a radial force fit.

17. The electric axle drive according to claim 16, wherein the securing element includes a planar inward portion resting against a radial annular shoulder formed on the inner diameter of the gear.

18. The electric axle drive according to claim 15, wherein the securing ring is snapped onto the first shaft in a securing groove on an outer diameter of the first shaft.

19. The electric axle drive according to claim 15, wherein the first shaft is hollow and further comprising a second shaft radially inside the first shaft.

20. The electric axle drive according to claim 19 further comprising a seal press fit into the end section of the gear and sealingly contacting the second shaft.

* * * * *